(12) United States Patent
Nakajima et al.

(10) Patent No.: US 9,367,716 B2
(45) Date of Patent: Jun. 14, 2016

(54) INFORMATION REPRODUCTION DEVICE AND INFORMATION REPRODUCTION METHOD

(71) Applicant: NIDEC SANKYO CORPORATION, Nagano (JP)

(72) Inventors: Shigeo Nakajima, Nagano (JP); Yoichi Isono, Nagano (JP); Katsuhisa Higashi, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/369,806

(22) PCT Filed: Mar. 27, 2013

(86) PCT No.: PCT/JP2013/058960
§ 371 (c)(1),
(2) Date: Jun. 30, 2014

(87) PCT Pub. No.: WO2013/146863
PCT Pub. Date: Oct. 3, 2013

(65) Prior Publication Data
US 2015/0108216 A1   Apr. 23, 2015

(30) Foreign Application Priority Data
Mar. 30, 2012  (JP) .................... 2012-081682

(51) Int. Cl.
G06K 7/08     (2006.01)
G11B 5/09     (2006.01)
G11B 20/10    (2006.01)
G11B 20/14    (2006.01)
H04L 27/156   (2006.01)

(52) U.S. Cl.
CPC  *G06K 7/084* (2013.01); *G11B 5/09* (2013.01); *G11B 20/10009* (2013.01); *G11B 20/14* (2013.01); *G11B 20/1403* (2013.01); *G11B 20/1419* (2013.01); *H04L 27/1563* (2013.01)

(58) Field of Classification Search
CPC ........................................... G06K 7/084
USPC ............................ 235/449, 494, 487; 360/29
See application file for complete search history.

(56) References Cited

FOREIGN PATENT DOCUMENTS

| JP | 62088108 | 4/1987 |
| JP | 02198008 | 8/1990 |
| JP | 652003 | 7/1994 |

OTHER PUBLICATIONS

International Search Report for International Application PCT/JP2013/058960; date of mailing, May 7, 2013 with English Translation.

*Primary Examiner* — Allyson Trail
(74) *Attorney, Agent, or Firm* — Cantor Colburn LLP

(57) ABSTRACT

An information reproduction device for use with a magnetic recording medium storing information may include an analog/digital (AD) converter structured to convert an analog signal, which is reproduced from the information recorded in the magnetic recording medium, into a digital signal; a peak detecting unit structured to detect a peak point of the reproduced signal, from the digital signal, according to a threshold as a judgment level in accordance with an output of the AD converter; and an information generating unit for generating structured to generate a rectangular waveform signal of the reproduced signal, waveform-shaped according to interval information of peak points detected by the peak detecting unit.

16 Claims, 5 Drawing Sheets

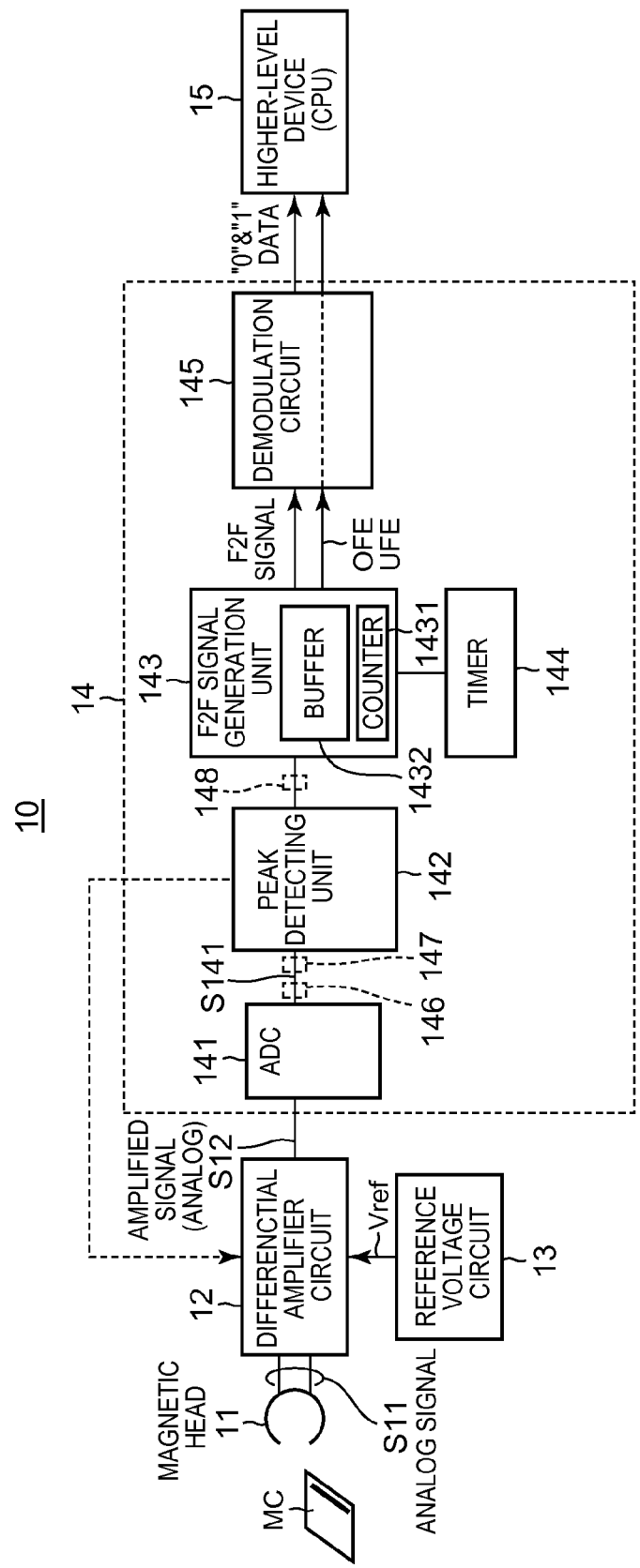

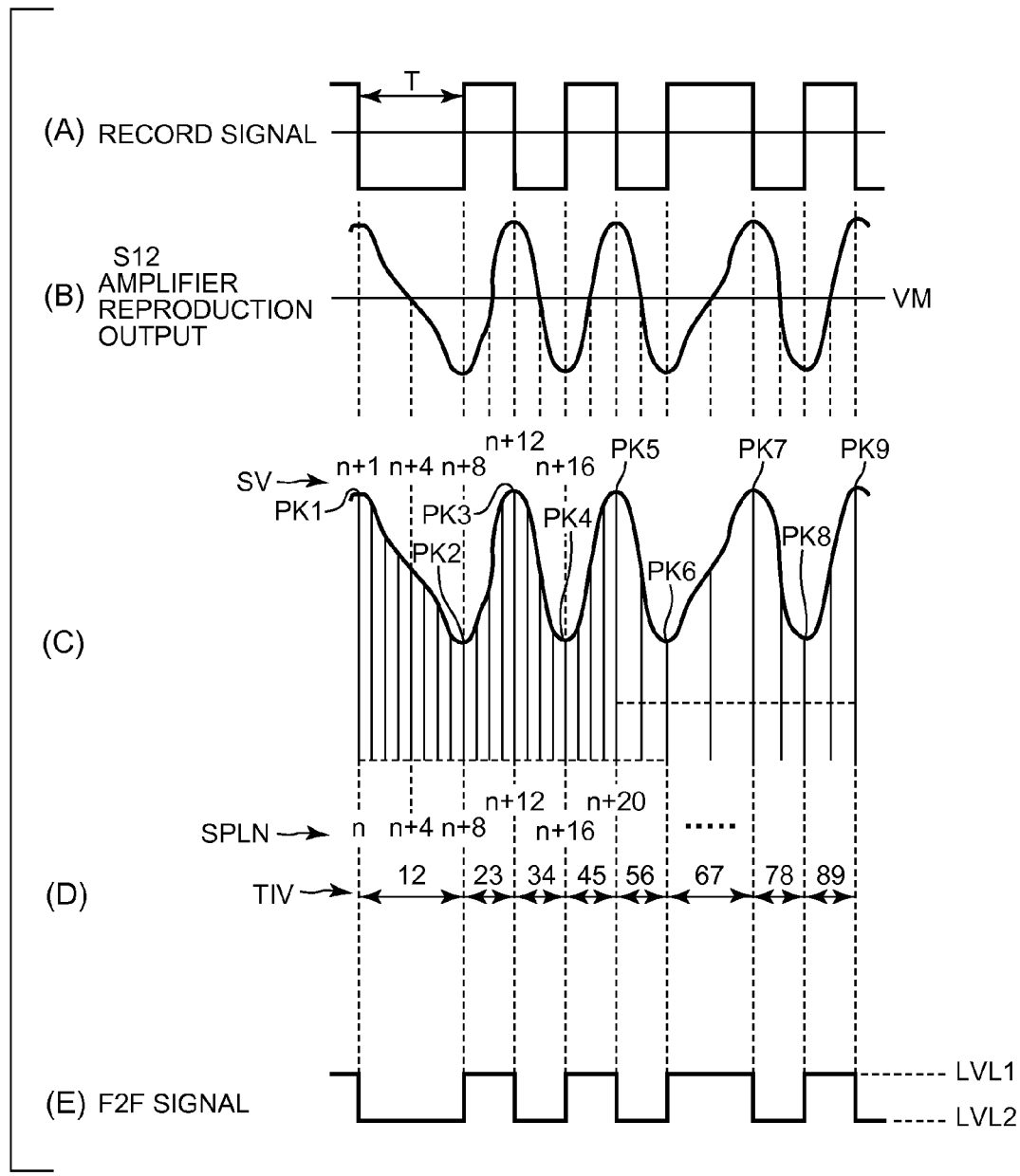

IN THE CASE OF SEARCH AT BOTTOM SIDE

IN THE CASE OF SEARCH AT PEAK SIDE

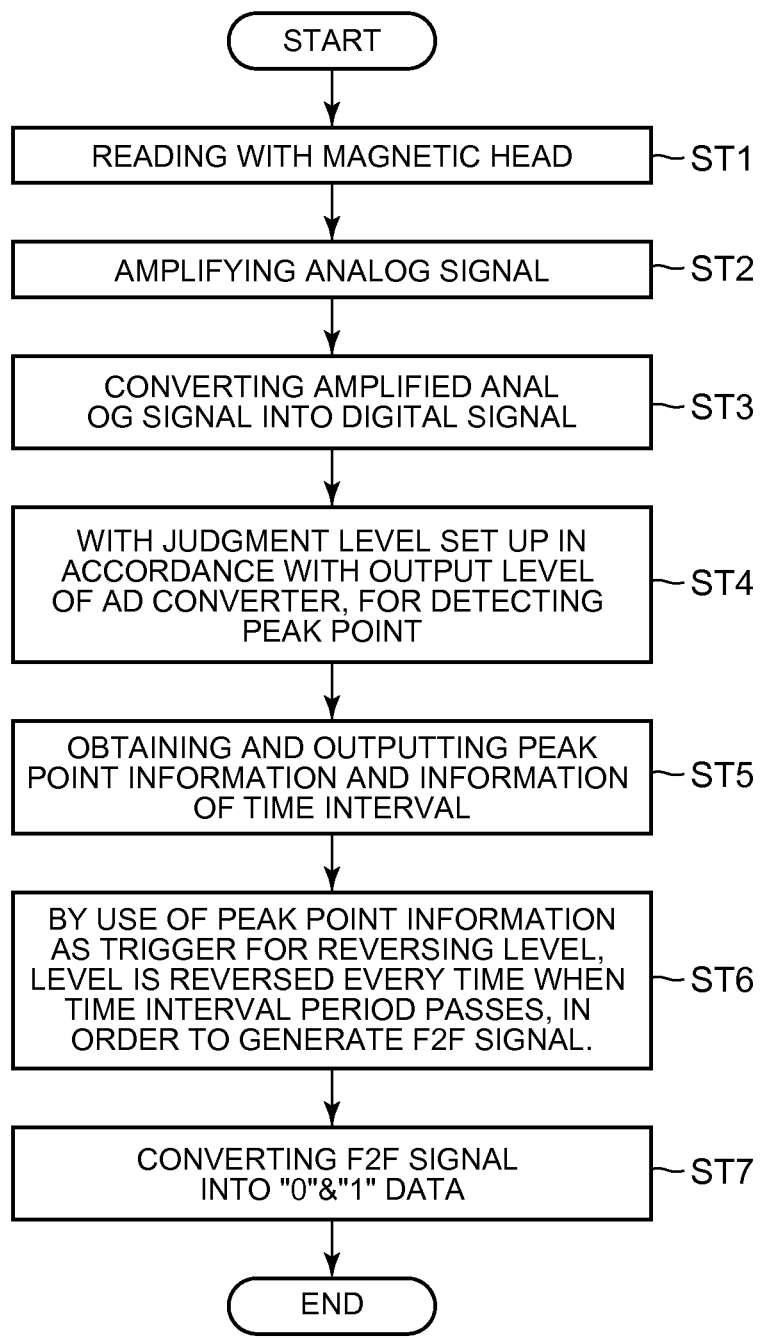

INFORMATION REPRODUCTION DEVICE AND INFORMATION REPRODUCTION METHOD

CROSS REFERENCE TO RELATED APPLICATIONS

This is the U.S. national stage of International Application No. PCT/JP2013/058960, filed on Mar. 27, 2013. Priority under 35 U.S.C. §119(a) and 35 U.S.C. §365(b) is claimed from Japanese Application No. 2012-081682, filed Mar. 30, 2012, the disclosures of which are both incorporated herein by reference.

FIELD OF THE INVENTION

The present invention relates to an information reproduction device and an information reproduction method, for reproducing recorded information of a recording medium, such as a magnetic card; the information being recorded according to a predetermined format (modulation method).

BACKGROUND

Described in Patent Document 1 is a magnetic regeneration circuit as an information generating device, the magnetic regeneration circuit being applied to a magnetic card reader/writer and the like, for reading an "F"&"2F" signal corresponding to a "0"&"1" signal, the "F"&"2F" signal being magnetically-recorded by means of a frequency modulation method.

In the magnetic regeneration circuit, a signal (information) recorded in a magnetic card is reproduced by using a magnetic head, and then the signal is amplified through an amplifying circuit. While a peak point is detected in a peak detection circuit as an analog circuit and an output signal is reversed at the peak point, an amplified signal of the amplifying circuit is waveform-shaped into a rectangular waveform signal. The rectangular waveform signal is a signal frequency-modulated (F2F-modulated), which is input into an F2F demodulation circuit and demodulated by way of digital signal processing.

PRIOR ART DOCUMENT

[Patent Document]
Patent Document 1: Japanese Unexamined Utility Model Registration Application Publication No. HEI06-52003

Incidentally, in the magnetic regeneration circuit described above, an analog waveform is amplified at first, and subsequently peak detection is carried out in the peak detection circuit as an analog circuit, and then an F2F signal is generated. Therefore, detection performance unfortunately becomes fixed according to a circuit constant of a capacitor, a resistor, and the like. In other words, it is difficult to have a peak detection threshold (judgment level) dynamically follow in an analog system. Accordingly, for example, in order to read a card with noise and a low-output card (demagnetized card), it is needed to switch over the circuit.

Namely, in the peak detection by way of an analog method, it is necessary to switch over the circuit for reading out (reading) a noise card as well as a demagnetized card. As a result, there arises a disadvantage, such as an enlarged circuit size and an increased cost. Moreover, since switching over the circuit is necessary, it is needed to try a plurality of methods for the reading operation so that the reading time becomes longer.

SUMMARY

Then, at least an embodiment of the present invention provides an information reproduction device and an information reproduction method that are able to deal with even a recording medium having a fluctuated output, without switching over the circuit, and also able to suppress an increase of the circuit size and an increase in cost, and to shorten the reading time.

An information reproduction device of a first aspect of at least an embodiment of the present invention includes; an analog/digital (AD) converter for converting an analog signal, which is reproduced from information recorded in a magnetic recording medium, into a digital signal; a peak detecting unit for detecting a peak point of the reproduced signal, from the digital signal, according to a threshold as a judgment level in accordance with an output of the AD converter; and an information generating unit for generating a rectangular waveform signal of the reproduced signal, waveform-shaped according to interval information of peak points detected by the peak detecting unit.

This makes it possible to deal with even a recording medium having a fluctuated output, without switching over the circuit, and also to suppress an increase of the circuit size and an increase in cost, and to shorten the reading time.

Preferably, the peak detecting unit calculates a time interval between neighboring peak points; and by use of information being a peak point as a trigger, the information generating unit reverses a level of a signal, to be generated, from a first level to a second level, or otherwise reverses a level of a signal from the second level to the first level; then, from the peak point until having spent a period of the time interval between peak points, the information generating unit keeps the signal, to be generated, at the second level or the first level; and at the time of having spent the period of the time interval between the peak points, the information generating unit reverses the level of the signal, to be generated, from the second level to the first level, or otherwise reverses the level of the signal from the first level to the second level. This makes it possible to easily generate a rectangular waveform signal.

Preferably, at the time of determining a peak value, the peak detecting unit calculates a correction value by multiplying a difference between a first peak value of a determination object and a second peak value, located at least one peak value before the first peak value, by a predetermined ratio based on the difference; and calculates a threshold by adding or subtracting the correction value to/from an intermediate value between the first peak value and the second peak value, and makes a judgment on whether or not the determination object is a peak value, by use of the threshold. This makes it possible to deal with even a recording medium having a fluctuated output, without switching over the circuit.

Preferably, at the time of determining a peak value, the peak detecting unit calculates a correction value by multiplying a difference between a first peak value of a determination object and a second peak value, located at least one peak value before the first peak value, by a predetermined ratio based on the difference; and calculates a threshold by adding or subtracting the correction value to/from an intermediate value between the first peak value and the second peak value, and makes a judgment on whether or not the determination object is a peak value, by use of the threshold and the intermediate value between the first peak value and the second peak value. This makes it possible to certainly deal with even a recording medium having a fluctuated output, without switching over the circuit.

Preferably, at the time of determining a peak value, with respect to a first peak value of a determination object, the peak detecting unit uses a second peak value, located immediately before the first peak value, and a third peak value, located two peak values before the first peak value, and calculates a first correction value by multiplying a difference between the third peak value and the second peak value, by a predetermined ratio based on the difference; and calculates a first threshold by adding or subtracting the first correction value to/from a first intermediate value between the third peak value and the second peak value; then the peak detecting unit calculates a second correction value, by multiplying a difference between the second peak value and the first peak value by a predetermined ratio based on the difference; and calculates a second threshold by adding or subtracting the second correction value to/from a second intermediate value between the second peak value and the first peak value, and determines the first peak value, by making sure that a value of a digital signal exceeds the first intermediate value between the third peak value and the second peak value, as well as the first threshold, and exceeds the second intermediate value between the second peak value and the first peak value, as well as the second threshold. This makes it possible to certainly deal with even a recording medium and the like, having much noise, and reproduce information from it.

Preferably, in a reproduced signal, as peak values being placed across an intermediate value, there alternately exist a peak value at a maximum value side and a peak value at a minimum value side; in the case where the first peak value of a determination object is a peak value at the minimum value side, the peak detecting unit uses a second peak value at the maximum value side, located immediately before the first peak value, and a third peak value at the minimum value side, located two peak values before the first peak value; and calculates the first correction value by multiplying a difference between the third peak value and the second peak value, by a predetermined ratio based on the difference; and calculates the first threshold, by adding the first correction value to the first intermediate value between the third peak value and the second peak value; and sets up the first threshold, at the maximum value side in relation to the first intermediate value between the third peak value and the second peak value; then the peak detecting unit calculates the second correction value, by multiplying a difference between the second peak value and the first peak value by a predetermined ratio based on the difference; and calculates the second threshold, by adding the second correction value to the second intermediate value between the second peak value and the first peak value; and sets up the second threshold at the maximum value side in relation to the second intermediate value between the second peak value and the first peak value, and determines the first peak value, by making sure that the value of the digital signal exceeds the first intermediate value between the third peak value and the second peak value as well as the first threshold; and exceeds the second intermediate value between the second peak value and the first peak value as well as the second threshold.

Preferably, in a reproduced signal, as peak values being placed across an intermediate value, there alternately exist a peak value at a maximum value side and a peak value at a minimum value side; in the case where the first peak value of a determination object is a peak value at the maximum value side, the peak detecting unit uses a second peak value at the minimum value side, located immediately before the first peak value, and a third peak value at the maximum value side, located two peak values before the first peak value; and calculates the first correction value by multiplying a difference between the third peak value and the second peak value, by a predetermined ratio based on the difference; and calculates the first threshold, by subtracting the first correction value from the first intermediate value between the third peak value and the second peak value; and sets up the first threshold, at the minimum value side in relation to the first intermediate value between the third peak value and the second peak value; then the peak detecting unit calculates the second correction value, by multiplying a difference between the second peak value and the first peak value by a predetermined ratio based on the difference; and calculates the second threshold, by subtracting the second correction value from the second intermediate value between the second peak value and the first peak value; and sets up the second threshold at the minimum value side in relation to the second intermediate value between the second peak value and the first peak value, and determines the first peak value, by making sure that the value of the digital signal exceeds the first intermediate value between the third peak value and the second peak value as well as the first threshold; and exceeds the second intermediate value between the second peak value and the first peak value as well as the second threshold.

Preferably, the peak detecting unit determines the first peak value, by making sure that the value of the digital signal discretely changes from the third peak value to the second peak value so as to exceed the first intermediate value and the first threshold; and the value of the digital signal discretely changes from the first peak value to a next peak value so as to exceed the second intermediate value and the second threshold.

An information reproduction method of a second aspect of at least an embodiment of the present invention includes; an analog/digital (AD) converting step for converting an analog signal, which is reproduced from information recorded in a magnetic recording medium, into a digital signal; a peak detecting step for detecting a peak point of the reproduced signal, from the digital signal, according to a threshold as a judgment level in accordance with an output of the AD converting step; and an information generating step for generating a rectangular waveform signal of the reproduced signal, waveform-shaped according to interval information of peak points detected by the peak detecting step.

ADVANTAGEOUS EFFECT OF THE INVENTION

According to at least an embodiment of the present invention, it is possible to deal with even a recording medium having a fluctuated output, without switching over the circuit, and furthermore it is possible to suppress an increase of the circuit size and an increase in cost, and to shorten the reading time.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a block diagram showing a configuration example of a magnetic record information reproduction device according to a first embodiment of the present invention.

FIG. 2 includes diagrams showing signal processing waveforms in substantial sections of the magnetic record information reproduction device of FIG. 1.

FIG. 4 is a flowchart for explaining an outline of general operation of the magnetic record information reproduction device according to the present embodiment.

DESCRIPTION OF THE PREFERRED EMBODIMENTS

Figure 3A:
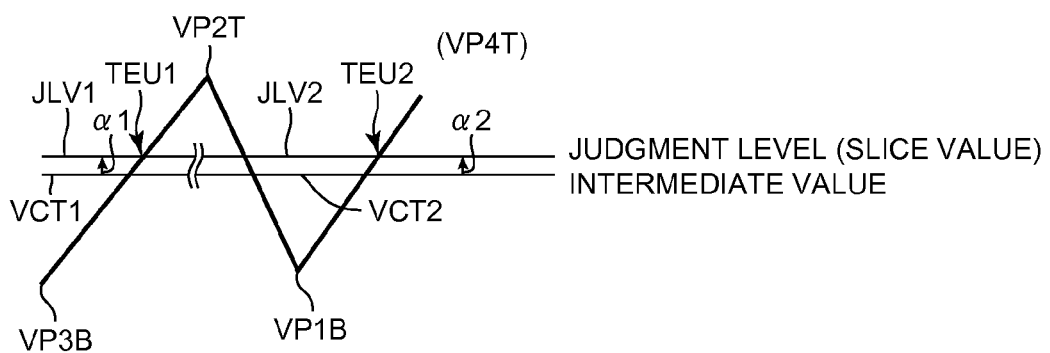
FIGS. 3A and 3B are diagrams for explaining a peak detection method that makes a judgment on whether it is a peak value or not, depending on whether two peak points exceed each corresponding threshold (judgment level) or not.

Embodiments of the present invention are explained below with reference to the accompanying drawings.

First Embodiment

FIG. 1 is a block diagram showing a configuration example of a magnetic record information reproduction device according to a first embodiment of the present invention.

FIG. 2 includes diagrams showing signal processing waveforms in substantial sections of the magnetic record information reproduction device of FIG. 1.

In the present embodiment, the magnetic record information reproduction device applicable to a magnetic card reader for reproducing information recorded in a magnetic card etc., as a recording medium, is explained as an example of an information reproduction device. Moreover, in the present embodiment, explained as an example is a case in which an "F"&"2F" signal corresponding to a "0"&"1" signal is read and reproduced, the "F"&"2F" signal being magnetically-recorded by means of a frequency modulation method. Nevertheless, the present technology can be applied, not only to an F2F method, but also to various other methods, such as an F3F method, an NRZI method, and MFM method, and the like.

As shown in FIG. 1, a magnetic record information reproduction device 10 is configured in such a way as to include a magnetic head 11, a differential amplifier circuit 12, a reference voltage circuit 13, a digital reproduction processing circuit 14, and a higher-level device (CPU) 15. The digital reproduction processing circuit 14 of the first embodiment includes: an analog/digital converter (AD converter: ADC) 141, a peak detecting unit 142, an F2F signal generating unit 143 as an information generating unit, a timer 144, and a demodulation circuit 145.

The magnetic head 11 reads out magnetic record information as an analog signal, the magnetic record information being recorded in a magnetic card MC as a magnetic recording medium by means of the F2F method, for example as shown in FIG. 2A.

Being configured with an operation amplifier, the differential amplifier circuit 12 amplifies an analog signal S11, which has been read out with the magnetic head 11 and reproduced, up to an adequate level; and then outputs an amplified analog signal S12, as shown in FIG. 2B, to the AD converter 141 of the digital reproduction processing circuit 14. In the differential amplifier circuit 12, an intermediate value VM of the output analog signal S12 is set up in accordance with a reference voltage Vref supplied by the reference voltage circuit 13.

Moreover, the differential amplifier circuit 12 can also be configured in such a way as to have a function for auto gain control (AGC). For example, as shown with a dotted line in FIG. 1, it is possible to configure the circuit in such a way as to control a gain of the differential amplifier circuit 12 in accordance with peak detection information at the peak detecting unit 142 of the digital reproduction processing circuit 14. In this case, the differential amplifier circuit 12 differentially-amplifies the analog signal S11 reproduced by the magnetic head 11 up to a level according to the peak detection information at the peak detecting unit 142 of the digital reproduction processing circuit 14. The differential amplifier circuit 12 carries out the gain control to set up the amplitude of a signal, for example, into a quarter of a full range.

The reference voltage circuit 13 supplies the differential amplifier circuit 12 with the reference voltage Vref to be set up as the intermediate value VM of an output level of the differential amplifier circuit 12.

The AD converter 141 converts the analog signal S12 amplified by the differential amplifier circuit 12, into a digital signal, and outputs the digital signal as a signal S141 to the peak detecting unit 142. The AD converter 141 converts the analog signal S12 amplified by the differential amplifier circuit 12, into the digital signal by way of sampling at a certain frequency; for example, at 300 kHz; and outputs it as the signal S141 to the peak detecting unit 142. In other words, the AD converter 141 converts the analog signal, reproduced by the magnetic head 11, into the digital signal by way of sampling at each predetermined time.

As shown in FIG. 2C, the AD converter 141 carries out sampling at each sampling point (at each timing); shown with sampling numbers, such as SPLN(n+1), - - -, (n+4), - - -. The sampling numbers SPLN are used as positional information in the peak detecting unit 142, at a next step. The positional information includes time-wise information. Then, the AD converter 141 outputs the signal S141, which includes the positional time-wise information composed of the sampling numbers SPLN and a value at each sampling point, such as SV(n+1), - - -, (n+4), - - -, to the peak detecting unit 142.

Receiving the output digital signal S141 from the AD converter 141, the peak detecting unit 142 detects a peak point corresponding to a position of an extreme value (a local maximum value and a local minimum value) in magnetic data.

The peak detecting unit 142 obtains information of a time interval (gap) TIV between peak points calculated according to a plurality of peak-point information sets, and outputs a signal S142, which includes the peak-point information sets and the information of a time interval TIV, to the F2F signal generating unit 143. The information of a time interval TIV as interval information corresponds to time interval information.

The peak detecting unit 142 automatically sets up a detection threshold (judgment level) of a waveform at a time of peak detection, in accordance with an output level of the AD converter 141. This function makes it possible to deal with even a magnetic card having a fluctuated output, without switching over a circuit. Applied in the peak detecting unit 142 is a method in which, for example with respect to a noise card, two peak points exceeding a certain threshold (judgment level) lead to a judgment of existence of a peak point. The detection method for detecting a peak point is described later in detail.

Moreover, as described above, the peak detecting unit 142 calculates time intervals; TIV12 through TIV89, - - -, as the time interval information, based on previous-and-next two peak points, as shown in FIGS. 2C and 2D.

In an example shown in FIG. 2, the peak detecting unit 142 calculates a time interval between a peak point PK1 and a peak point PK2, as the time interval TIV12; calculates a time interval between the peak point PK2 and a peak point PK3, as the time interval TIV23; calculates a time interval between the peak point PK3 and a peak point PK4, as the time interval TIV34; calculates a time interval between the peak point PK4 and a peak point PK5, as the time interval TIV45; calculates a time interval between the peak point PK5 and a peak point PK6, as the time interval TIV56; calculates a time interval between the peak point PK6 and a peak point PK7, as the time interval TIV67; calculates a time interval between the peak point PK7 and a peak point PK8, as the time interval TIV78; and calculates a time interval between the peak point PK8 and a peak point PK9, as the time interval TIV89.

The peak detecting unit 142 outputs the information of the calculated time intervals TIV(12 through 89, - - - ) together with the peak-point information sets to the F2F signal generating unit 143 as an information generating unit.

(Basic Peak Detection Method of the Peak Detecting Unit 142)

Explained below is a concrete processing example of peak detection in the peak detecting unit 142.

The peak detecting unit 142 makes a judgment with respect to the magnetic data, which has been converted by the AD converter 141 so as to be digital data, by using an initial threshold (judgment level) IJLV at first. If a digital value exceeds the judgment level IJLV, it is judged that the point is a peak.

The peak detecting unit 142 calculates a next judgment level JLV by using the previous peak value. Concretely to describe, a digital value of a peak (Max) minus a digital value of a bottom (Min) in a waveform leaves a value; PtoP=Max−Min; and the value PtoP multiplied by a certain ratio, based on the difference, is calculated as a value (correction value, or level); α. Then, adding the correction value α or subtracting the correction value α to/from an intermediate value VCT, between the digital value (Max) and the digital value (Min), leaves a value (level) as a judgment level JLV.

$$\text{The judgment level } JLV = VCT \pm PtoP*C = VCT \pm \alpha, \quad \text{(Expression 1)}$$

wherein the 'C' represents a constant, and as an example of the 'C', it is set up as; $C=1/2^n$, for example, $1/2^5=1/32$.

The judgment level is automatically set up according to the expression described above. Thus, it becomes possible to detect a card with a low output as well as a card with a high output. In other words, the peak detecting unit 142 automatically sets up the judgment level (detection threshold) of a waveform at a time of peak detection, in accordance with the output level of the AD converter 141. Thus, it is possible to deal with even a magnetic card having a fluctuated output, without switching over a circuit.

In this way, at the time of determining a peak value, as a general rule the peak detecting unit 142 calculates the correction value α by multiplying the difference between a first peak value of a determination object and a second peak value, located immediately before the first peak value, by a predetermined ratio based on the difference. The judgment level (threshold) JLV is calculated by adding the correction value α or subtracting the correction value α to/from an intermediate value between the first peak value and the second peak value. Then, depending on if a digital value exceeds the judgment level JLV that has been calculated and set up, the peak detecting unit 142 makes a judgment on whether or not the digital value is a peak value.

(More Accurate Peak Detection Method of the Peak Detecting Unit 142)

Moreover, in the present embodiment; for example, with respect to a noise card, the peak detecting unit 142 makes a judgment on whether or not a digital value is a peak value, depending on if not only one peak point but also two peak points exceed a judgment level (threshold). In this case, the peak detecting unit 142 automatically sets up a judgment level (detection threshold, or slice value) JVL and an intermediate value VCT in a difference between peak values, of a waveform at a time of peak detection, in accordance with an output level of the AD converter 141.

At the time of determining a peak value; with respect to a first peak value VP1 of a determination object, the peak detecting unit 142 carries out an arithmetic operation by using a second peak value VP2, located immediately before the first peak value VP1, and a third peak value VP3, located two peak values before the first peak value VP1. For the operation, the peak detecting unit 142 has a function of saving a digital value to be input as required as well as a determined peak value, in a saving unit, not shown, such as a register, a memory device and the like.

The peak detecting unit 142 calculates a first correction value; α1 or α11, by multiplying a difference between the third peak value VP3 and the second peak value VP2: (VP3−VP2), by a predetermined ratio 'C' ($=1/2^n$) based on the difference (an absolute value of the difference). At the same time in parallel, the peak detecting unit 142 calculates and sets up a first intermediate value; VCT1 or VCT11, between the second peak value VP2 and the third peak value VP3. Then, the peak detecting unit 142 calculates and sets up a first judgment level (threshold); JVL1 or JVL11, by adding or subtracting the first correction value; α1 or α11, to/from the first intermediate value; VCT1 or VCT11, between the third peak value VP3 and the second peak value VP2.

Moreover, the peak detecting unit 142 calculates and sets up a second correction value; α2 or α12, by multiplying a difference between the second peak value VP2 and the first peak value VP1: (VP2−VP1), by a predetermined ratio 'C' ($=1/2^n$) based on the difference. At the same time in parallel, the peak detecting unit 142 calculates and sets up a second intermediate value; VCT2 or VCT12, between the second peak value VP2 and the first peak value VP1. Then, the peak detecting unit 142 calculates and sets up a second judgment level (threshold); JVL2 or JVL12, by adding or subtracting the second correction value; α2 or α12 to/from the second intermediate value; VCT2 or VCT12 between the second peak value VP2 and the first peak value VP1.

Then, the peak detecting unit 142 determines the first peak value, by making sure that a value of a digital signal exceeds the first intermediate value; VCT1 or VCT11, as well as the first judgment level (threshold); JVL1 or JVL11, which has been set up; and exceeds the second intermediate value; VCT2 or VCT12, as well as the second judgment level (threshold); JVL2 or JVL12, which has been set up.

In a reproduced signal; as peak values being placed across an intermediate value, there alternately exist a peak value at a maximum (local maximum) value side (peak side) and a peak value at a minimum (local minimum) value side (bottom side). In peak detection with respect to such a signal, the peak detecting unit 142 has a different setup position for the judgment levels; JVL1, JVL2, JVL11, and JVL12, in relation to the intermediate values; VCT1, VCT2, VCT11, and VCT12, depending on whether the first peak value of a determination object is a peak value at the minimum value side (bottom side) or a peak value at the maximum value side (peak side). The peak detecting unit 142 sets up the first judgment level (threshold) JVL1 and the second judgment level (threshold) JVL2 at the maximum value side in relation to the first intermediate value VCT1 and the second intermediate value VCT2, when the first peak value of a determination object is a peak value at the minimum value side (bottom side). In other words, when the first peak value of a determination object is a peak value at the minimum value side (bottom side), the peak detecting unit 142 sets up the first judgment level (threshold) JVL1 and the second judgment level (threshold) JVL2 at the maximum value side in relation to the first intermediate value VCT1 and the second intermediate value VCT2, by adding the first correction value α1 to the first intermediate value VCT1 and adding the second correction value α2 to the second intermediate value VCT2.

The peak detecting unit 142 sets up the first judgment level (threshold) JVL11 and the second judgment level (threshold) JVL12 at the minimum value side in relation to the first intermediate value VCT11 and the second intermediate value VCT12, when the first peak value of a determination object is a peak value at the maximum value side (peak side). In other words, when the first peak value of a determination object is a peak value at the maximum value side (peak side), the peak detecting unit 142 sets up the first judgment levels (thresholds) JVL11 and JVL12 at the minimum value side in relation to the first intermediate value VCT11 and the second intermediate value VCT12, by subtracting the first correction value α11 from the first intermediate value VCT11 and subtracting the second correction value α2 from the second intermediate value VCT112.

A process of determining the peak value is explained below with reference to FIG. 3A and FIG. 3B.

Figure 3B:
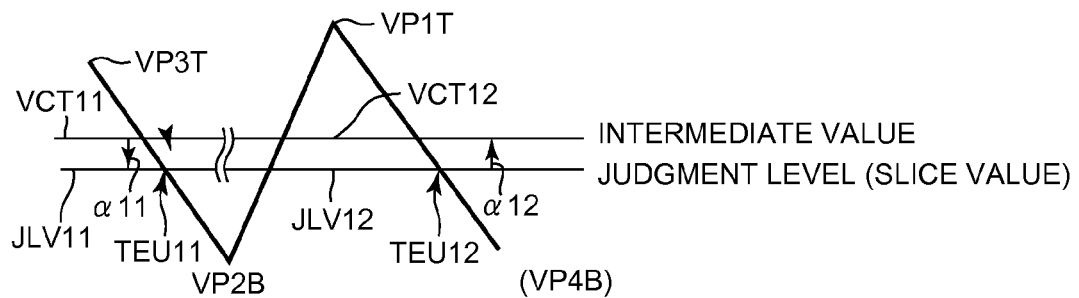

FIG. 3A and FIG. 3B are diagrams for explaining a peak detection method that makes a judgment on whether it is a peak value or not, depending on whether two peak points exceed each corresponding threshold (judgment level) or not. FIG. 3A is a diagram for explaining a peak detection method in the case where the first peak value of a determination object is a peak value at the minimum value side (bottom side), and meanwhile FIG. 3B is a diagram for explaining a peak detection method in the case where the first peak value of a determination object is a peak value at the maximum value side (peak side). Incidentally, for understanding the cases easily, each signal waveform in FIG. 3A and FIG. 3B is shaped as a triangular waveform.

(Peak Detection Method in the Case Where the First Peak Value of a Determination Object is a Peak Value at the Minimum Value Side (Bottom Side))

The peak detection method in the case where the first peak value of a determination object is a peak value at the minimum value side (bottom side) is explained at first with reference to FIG. 3A.

In the case where the first peak value VP1B of a determination object is a peak value at the minimum value side, the peak detecting unit 142 uses a second peak value VP2T at the maximum value side, located immediately before the first peak value VP1B, and a third peak value VP3B at the minimum value side, located two peak values before the first peak value VP1B. The peak detecting unit 142 calculates the first correction value α1, by multiplying a difference between the third peak value VP3B and the second peak value VP2T: (VP3B−VP2T) by a predetermined ratio C1 (=1/2$^n$) based on the difference.

At the same time in parallel, the peak detecting unit 142 calculates and sets up a first intermediate value VCT1 between the second peak value VP2T and the third peak value VP3B. Then, the peak detecting unit 142 calculates and sets up the first judgment level (threshold) JVL1, by adding the first correction value α1 to the first intermediate value VCT1 between the third peak value VP3B and the second peak value VP2T.

The peak detecting unit 142 sets up the first judgment level JVL1, at the maximum value side (peak side) in relation to the first intermediate value VCT1 between the second peak value VP2T and the third peak value VP3B. The peak detecting unit 142 makes a judgment on whether or not a value of a digital signal from the AD converter 141 exceeds the first intermediate value VCT1 and the first judgment level JVL1, which have been set up.

Moreover, the peak detecting unit 142 calculates and sets up the second correction value α2, by multiplying a difference between the second peak value VP2T and the first peak value VP1B: (VP2T−VP1B) by a predetermined ratio C2 (=1/2$^n$) based on the difference. At the same time in parallel, the peak detecting unit 142 calculates and sets up a second intermediate value VCT2 between the second peak value VP2T and the first peak value VP1B.

Then, the peak detecting unit 142 calculates and sets up the second judgment level (threshold) JVL2, by adding the second correction value α2 to the second intermediate value VCT2 between the second peak value VP2 and the first peak value VP1.

The peak detecting unit 142 sets up the second judgment level JVL2, at the maximum value side (peak side) in relation to the second intermediate value VCT2 between the second peak value VP2T and the first peak value VP1B. The peak detecting unit 142 makes a judgment on whether or not the value of the digital signal from the AD converter 141 exceeds the second intermediate value VCT2 and the second judgment level JVL2, which have been set up. Then, the peak detecting unit 142 determines the first peak value VP1B, by making sure that the value of the digital signal exceeds the first intermediate value VCT1 as well as the first judgment level JVL1, which have been set up; and moreover exceeds the second intermediate value VCT2 as well as the second judgment level JVL2, which have been set up.

Making sure that the digital value exceeds the first intermediate value VCT1 as well as the first judgment level JVL1, and making sure that the same exceeds the second intermediate value VCT2 as well as the second judgment level JVL2, may be carried out separately in succession to each setup process, and may also be carried out serially.

The peak detecting unit 142 makes sure whether or not the value of the digital signal discretely changes (increases) from the third peak value VP3B to the second peak value VP2T to exceed the first intermediate value VCT1 and the first judgment level JVL1, as shown in FIG. 3A. Moreover, the value of the digital signal discretely changes (increases) from the first peak value VP1B to a next peak value (VP4T), and at the time TEU2 when the value of the digital signal exceeds the second intermediate value VCT2 and the second judgment level JVL2, the peak detecting unit 142 determines the first peak value VP1B.

(Peak Detection Method in the Case Where the First Peak Value of a Determination Object is a Peak Value at the Maximum Value Side (Peak Side))

The peak detection method in the case where the first peak value of a determination object is a peak value at the maximum value side (peak side) is explained next with reference to FIG. 3B.

In the case where the first peak value VP1T of a determination object is a peak value at the maximum value side, the peak detecting unit 142 uses a second peak value VP2B at the minimum value side, located immediately before the first peak value VP1T, and a third peak value VP3T at the maximum value side, located two peak values before the first peak value VP1T. The peak detecting unit 142 calculates the first correction value α11, by multiplying a difference between the third peak value VP3T and the second peak value VP2B: (VP3T−VP2B) by a predetermined ratio C11 (=1/2$^n$) based on the difference. At the same time in parallel, the peak detecting unit 142 calculates and sets up a first intermediate value VCT11 between the second peak value VP2B and the third peak value VP3T. Then, the peak detecting unit 142 calculates and sets up the first judgment level (threshold) JVL11, by subtracting the first correction value α11 from the first intermediate value VCT11 between the third peak value VP3T and the second peak value VP2B.

The peak detecting unit 142 sets up the first judgment level JVL11, at the minimum value side (bottom side) in relation to the first intermediate value VCT11 between the second peak value VP2B and the third peak value VP3T. The peak detecting unit 142 makes a judgment on whether or not a value of a digital signal from the AD converter 141 exceeds the first intermediate value VCT11 and the first judgment level JVL11, which have been set up.

Moreover, the peak detecting unit 142 calculates the second correction value α12, by multiplying a difference between the second peak value VP2B and the first peak value VP1T: (VP2B−VP1T) by a ratio C12 (=1/2$^n$ based on the difference (an absolute value of the difference). At the same time in parallel, the peak detecting unit 142 calculates and sets up a second intermediate value VCT12 between the second peak value VP2B and the first peak value VP1T. Then, the peak detecting unit 142 calculates and sets up the second judgment level (threshold) JVL12, by subtracting the second correction value α12 from the first intermediate value VCT12 between the second peak value VP2B and the first peak value VP1T.

The peak detecting unit 142 sets up the second judgment level JVL12, at the minimum value side (bottom side) in relation to the second intermediate value VCT2 between the second peak value VP2B and the first peak value VP1T. The peak detecting unit 142 makes a judgment on whether or not the value of the digital signal from the AD converter 141 exceeds the second intermediate value VCT12 and the second judgment level JVL12, which have been set up. Then, the peak detecting unit 142 determines the first peak value VP1T, by making sure that the value of the digital signal exceeds the first intermediate value VCT11 as well as the first judgment level JVL11, which have been set up; and moreover exceeds the second intermediate value VCT12 as well as the second judgment level JVL12, which have been set up.

Making sure that the digital value exceeds the first intermediate value VCT11 as well as the first judgment level JVL11, and making sure that the same exceeds the second intermediate value VCT12 as well as the second judgment level JVL12, may be carried out separately in succession to each setup process, and may also be carried out serially.

The peak detecting unit 142 makes sure whether or not the value of the digital signal discretely changes (as the value becomes smaller) from the third peak value VP3T to the second peak value VP2B to exceed the first intermediate value VCT11 and the first judgment level JVL11, as shown in FIG. 3B. Moreover, the value of the digital signal discretely changes (as the value becomes smaller) from the first peak value VP1T to a next peak value (VP4B), and at the time TEU12 when the value of the digital signal exceeds the second intermediate value VCT12 and the second judgment level JVL12, the peak detecting unit 142 determines the first peak value VP1T.

The peak detecting unit 142 is explained above in detail.

Explained next are a configuration and a function of the F2F signal generating unit 143 as an information generating unit.

The F2F signal generating unit 143 generates a rectangular waveform signal of a reproduced signal, which is waveform-shaped according to a time interval TIV as time interval information of peak points detected by the peak detecting unit 142. By use of information being a peak point as a trigger, the F2F signal generating unit 143 reverses a level of a signal, to be generated, from a first level LVL1 to a second level LVL2, or otherwise reverses the level of the signal from the second level LVL2 to the first level LVL1. For example, the first level LVL1 is a level corresponding to a logical "1", and meanwhile the second level LVL2 is a level corresponding to a logical "0". Incidentally, these two levels may replace each other. From the peak point as a trigger, until having spent a period of a time interval (a gap of time) TIV between peak points, the F2F signal generating unit 143 keeps the signal, to be generated, at the second level LVL2 or the first level LVL1.

Then, at the time of having spent the period of the time interval (a gap of time) TI between the peak points, the F2F signal generating unit 143 reverses the level of the signal, to be generated, from the second level LVL2 to the first level LVL1, or otherwise reverses from the first level LVL1 to the second level LVL2.

In F2F signal generating operation of the F2F signal generating unit 143, a time interval signal calculated with respect to two peak points positioned in series is compared with a counter value of an internal counter 1431 for counting a timing result of the timer 144, and if the time interval signal is consistent with the counter value, the F2F signal output is reversed. For example, in the case where a time interval datum 'b' is input while a time interval datum at a last time of F2F signal output reversing is 'a', a next reversing time comes up at '(a+b)'. If this method is adopted as it is, a normal output could possibly not be made when there occurs a time difference between interval time to be input and output timing of an F2F signal to be output. In order to avoid such inconvenience, the F2F signal generating unit 143 has a buffer 1432 including a function for a time adjustment. Size of the buffer is, for example, 16 words (16*16 bits).

The F2F signal generating operation of the F2F signal generating unit 143 is explained below with reference to FIG. 2.

At first, by use of information of the peak point PK1 as a trigger, the signal is reversed (switched) from the first level LVL1 to the second level LVL2. A time interval from the peak point PK1 to a next peak point; PK2 is TIV12; and for a period of the time interval TIV12, the output signal level is kept at the second level LVL2 that is a reversed level.

When a counter value of the internal counter 1431 reaches an end of a period of the time interval TIV12 from the trigger point, as a result of observation with the timer 144, the output signal level is reversed from the second level LVL2 to the first level LVL1. A time interval from the peak point PK2 to a next peak point; PK3 is TIV23; and for a period of the time interval TIV23, the output signal level is kept at the first level LVL1 that is a reversed level.

When the counter value of the internal counter 1431 reaches an end of a summed up period of the time intervals TIV12 and TIV23 (TIV12+TIV23) from the trigger point, as a result of observation with the timer 144, the output signal level is reversed from the first level LVL1 to the second level LVL2. A time interval from the peak point PK3 to a next peak point; PK4 is TIV34; and for a period of the time interval TIV34, the output signal level is kept at the second level LVL2 that is a reversed level.

When the counter value of the internal counter 1431 reaches an end of a summed up period of the time intervals TIV12, TIV23, and TIV34 (TIV12+TIV23+TIV34) from the trigger point, as a result of observation with the timer 144, the output signal level is reversed from the second level LVL2 to the first level LVL1. A time interval from the peak point PK4 to a next peak point; PK5 is TIV45; and for a period of the time interval TIV45, the output signal level is kept at the first level LVL1 that is a reversed level.

When the counter value of the internal counter 1431 reaches an end of a summed up period of the time intervals TIV12, TIV23, TIV34, and IV45 (TIV12+TIV23+TIV34+ TIV45) from the trigger point, as a result of observation with the timer 144, the output signal level is reversed from the first level LVL1 to the second level LVL2. A time interval from the peak point PK5 to a next peak point; PK6 is TIV56; and for a period of the time interval TIV56, the output signal level is kept at the second level LVL2 that is a reversed level.

When the counter value of the internal counter 1431 reaches an end of a summed up period of the time intervals TIV12, TIV23, TIV34, TIV45, and TIV56 (TIV12+TIV23+ TIV34+TIV45+TIV56) from the trigger point, as a result of observation with the timer 144, the output signal level is reversed from the second level LVL2 to the first level LVL1. A time interval from the peak point PK6 to a next peak point; PK7 is TIV67; and for a period of the time interval TIV67, the output signal level is kept at the first level LVL1 that is a reversed level.

When the counter value of the internal counter 1431 reaches an end of a summed up period of the time intervals TIV12, TIV23, TIV34, TIV45, TIV56, and TIV67 (TIV12+ TIV23+TIV34+TIV45+TIV56+TIV67) from the trigger point, as a result of observation with the timer 144, the output signal level is reversed from the first level LVL1 to the second level LVL2. A time interval from the peak point PK7 to a next peak point; PK8 is TIV78; and for a period of the time interval TIV78, the output signal level is kept at the second level LVL2 that is a reversed level.

When the counter value of the internal counter 1431 reaches an end of a summed up period of the time intervals TIV12, TIV23, TIV34, TIV45, TIV56, TIV67, and TIV78 (TIV12+TIV23+TIV34+TIV45+TIV56+TIV67+TIV78) from the trigger point, as a result of observation with the timer 144, the output signal level is reversed from the second level LVL2 to the first level LVL1. A time interval from the peak point PK8 to a next peak point; PK9 is TIV89; and for a period of the time interval TIV89, the output signal level is kept at the first level LVL1 that is a reversed level.

Operation is conducted in the F2F signal generating unit 143, as described above, in order to generate an F2F signal, and the signal is output to the demodulation circuit 145.

The F2F signal generating unit 143 is configured in such a way as to include a FIFO (First In First Out) as a buffer. In the case where overwriting FIFO happens before an F2F signal output operation finishes outputting data because of an error detection, the F2F signal generating unit 143 outputs an overflow error; OFE. Contrarily, in the case where the counter value of the internal counter 1431 has already passed the time when interval data is updated, the F2F signal generating unit 143 outputs an underflow error; UFE.

The F2F signal generating unit 143 outputs the overflow error OFE or the underflow error UFE to the demodulation circuit 145; or outputs directly or by way of the demodulation circuit 145 to the higher-level device 15.

The demodulation circuit 145 converts the F2F signal generated by the F2F signal generating unit 143 into "0"&"1" data, and transfers the data to the higher-level device 15. Wherein, for example, a bit width already judged with respect to "0" & "1" is expressed as 'T'; if next level reversing (bit reversing) exists within 3/4 T (sometimes, another such as 5/7 T, 5/8 T and the like may be applied), the demodulation circuit 145 judges the bit to be a logical "1". Contrarily, if next level reversing does not exist within 3/4 T, the demodulation circuit 145 judges the bit to be a logical "0". Since, in this manner, the demodulation circuit 145 receives an F2F signal already generated by the F2F signal generating unit 143, and converts the signal into "0"&"1" data, a configuration of the demodulation circuit 145 can greatly be simplified, being compared with a case where detection data of the peak detecting unit is received and demodulated.

Next, an overall operation of the magnetic record information reproduction device 10 having the configuration described above is explained below with reference to the flowchart of FIG. 4.

By way of moving a magnetic card and the like relative to the magnetic head (HD) 11, the magnetic head 11 outputs the analog signal S11 (ST1), and then the analog signal S11 is amplified to an appropriate value (level) by the differential amplifier circuit 12 with an operation amplifier (Op. Amp) (ST2). The amplified analog signal S12 is input into the AD converter 141, and then converted into a digital signal by the AD converter 141 (ST3). The digital signal converted by the AD converter 141 is output as the signal S141 to the peak detecting unit 142. At the time, the digital signal; including positional (time-wise) information created according to the sampling numbers SPLN and each sampling point value such as SV(n+1), - - - , (n+4), - - - ; is output from the AD converter 141 to the peak detecting unit 142, wherein the positional information and the sampling point values being associated with the sampling operation.

In the peak detecting unit 142, the output digital signal S141 is received from the AD converter 141, and detected there is the peak point corresponding to a position of an extreme value (a local maximum value and a local minimum value) in magnetic data (ST4). In the peak detecting unit 142, the detection threshold as a judgment level for a waveform at the time of peak detection is automatically set up, in accordance with an output level of the AD converter 141. In this way, it is possible to deal with even a magnetic card having a fluctuated output, without switching over a circuit. In the peak detecting unit 142, the magnetic data converted into digital data is judged at first by using the initial judgment level (threshold), and it is judged to be a peak if the magnetic data exceeds the judgment level.

A next judgment level is calculated by using the previous peak value. Concretely to describe, a digital value of a peak (Max) minus a digital value of a bottom (Min) in a waveform leaves a value; PtoP=Max−Min; and the value PtoP multiplied by a certain ratio 'C', for example; (=1/2$^n$, is calculated as a value (correction value, or level) α. Then, adding the correction value α or subtracting the correction value α to/from an intermediate value VCT, between the digital value (Max) and the digital value (Min), leaves a value (level) as a judgment level JLV, which is automatically set up. Then, information of a time interval (gap) TIV between peak points calculated according to a plurality of peak-point information sets is obtained in the peak detecting unit 142, and the signal S142 including the peak-point information sets and the information of the time interval TIV is output to the F2F signal generating unit 143 (ST5).

In the F2F signal generating unit 143, a signal level is reversed by use of information being a peak point as a trigger; and every time when a time interval period passes, reversing the level is carried out in order to generate an F2F signal (ST6). In F2F signal generating operation of the F2F signal generating unit 143, a time interval signal calculated with respect to two peak points positioned in series is compared with a counter value of the internal counter 1431 for counting a timing result of the timer 144, and if the time interval signal is consistent with the counter value, the F2F signal output is reversed. For example, as described above, in the case where a time interval datum 'b' is input while a time interval datum at a last time of F2F signal output reversing is 'a', a next reversing time comes up at '(a+b)'. At this time, the buffer 1432 makes an adjustment in order to output normally, when there occurs a time difference between interval time to be input and output timing of an F2F signal to be output.

The F2F signal generated by the F2F signal generating unit 143 is converted into "0"&"1" data by the demodulation circuit 145, and transferred to the higher-level device 15 (ST7).

Incidentally, by adding a circuit mentioned below to the digital reproduction processing circuit 14 including the peak detecting unit, the performance can be improved.

At least either of a digital filter 146 and a moving average unit 147 can be placed between an output side of the AD converter 141 and the peak detecting unit 142, as shown with dashed lines in FIG. 1.

(1) For example, by placement of the digital filter 146 at the output side of the AD converter 141, digital data is digital-filtered for de-noising after AD conversion and before peak detection.

(2) For example, by placement of the moving average unit 147 at the output side of the AD converter 141, magnetic data after AD conversion can be moving-averaged in order to smooth the data for de-noising.

(3) For example, by placement of the digital filter 146 and the moving average unit 147 at the output side of the AD converter 141, magnetic data after AD conversion can be digital-filtered, and then subsequently moving-averaged, for de-noising.

Moreover, for example, by placement of a noise-pulse removal unit 148 at the output side of the peak detecting unit 142, a noise pulse having a shorter interval than a normal F2F signal has can be removed. For example, a pulse having a certain-percentage interval of a 2F signal is removed as noise.

Moreover, as described above, an auto gain control (AGC) is carried out for a gain of the differential amplifier circuit 12. In this case, the differential amplifier circuit 12 differentially-amplifies the analog signal S11 reproduced by the magnetic head 11 according to the peak detection information at the peak detecting unit 142 of the digital reproduction processing circuit 14. The differential amplifier circuit 12 carries out the gain control to set up the amplitude of a signal, for example, into a quarter of a full range.

As described above, according to the present embodiment, the following effects can be obtained.

In peak detection by a conventional analog method, it is necessary to switch over the circuit in order to read out, for example, a noise card as well as a demagnetized card so that a circuit size becomes enlarged and a cost increases. Furthermore, since it is needed to switch over the circuit, trying a plurality of methods is necessary for reading out, and therefore reading time becomes long. On the other hand, in the peak detection of a digital method according to the present embodiment, the threshold of the peak detection can automatically be switched over according to an output level of an analog signal, and therefore it becomes unnecessary to switch over the circuit so that a circuit size becomes smaller and a cost can be reduced. Moreover, since both a noise card as well as a demagnetized card can be dealt with by way of one-time reading, reading time can be shortened.

In peak detection by a conventional analog method, an analog waveform and an F2F signal are output almost at the same time; and meanwhile in a digital method, there occurs a timing gap between a peak signal detected in a digital circuit and an analog signal, owing to an arithmetic operation to be carried out. Therefore, it becomes difficult to conduct a measurement of variation (jitter) in card speed and time intervals by use of the peak signal. On the other hand, according to the present embodiment, a measurement of speed as well as a measurement of the jitters can be carried out by way of generating an F2F signal digitally.

Incidentally, the digital reproduction processing circuit including the peak detecting unit can be embedded in an FPGA (Field-Programmable Gate Array) and an ASIC (Application Specific Integrated Circuit).

Second Embodiment

Figure 5:
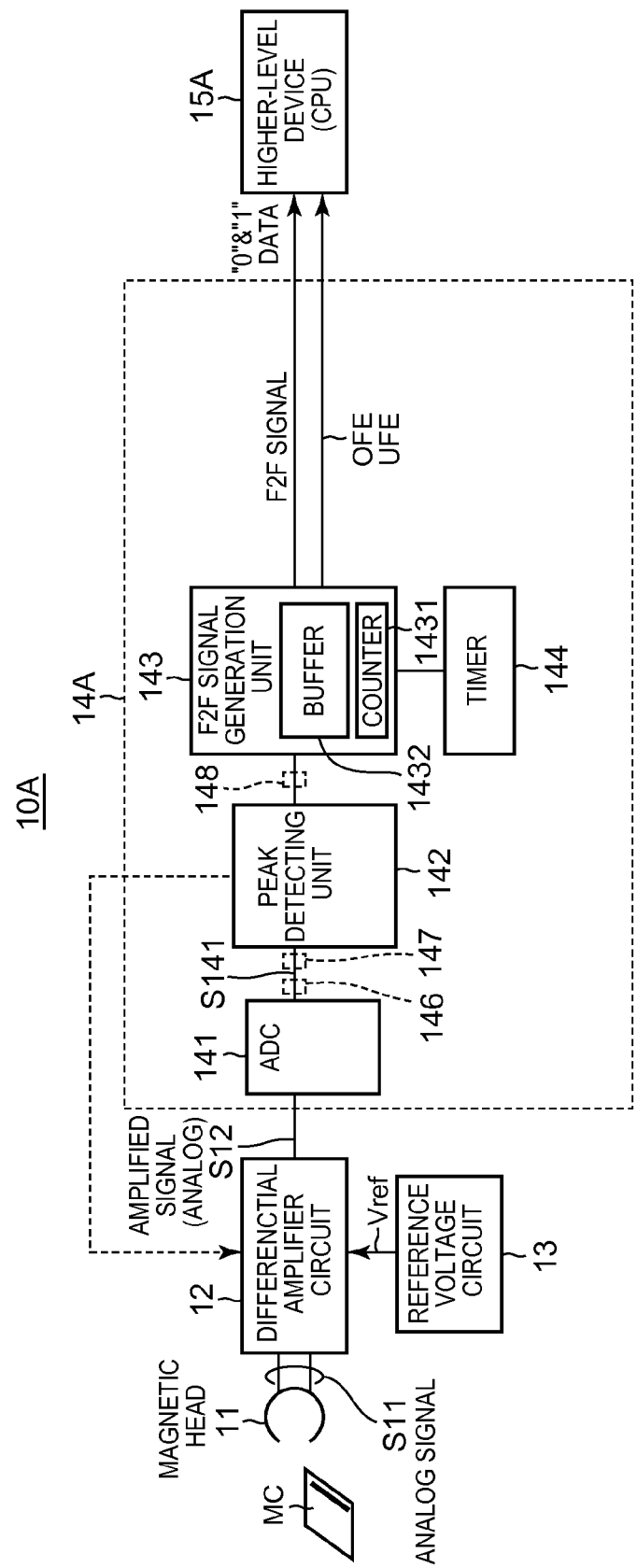
FIG. 5 is a block diagram showing a configuration example of a magnetic record information reproduction device according to a second embodiment of the present invention.

FIG. 5 is a block diagram showing a configuration example of a magnetic record information reproduction device according to a second embodiment of the present invention.

A difference of a magnetic record information reproduction device 10A according to this second embodiment, from the magnetic record information reproduction device 10 according to the first embodiment, is a point that no demodulation circuit is placed in a digital reproduction processing circuit 14A. In the magnetic record information reproduction device 10A, a function of the demodulation circuit is included at a side of a higher-level device 15A.

Other part of the configuration is the same as that of the first embodiment; and according to this second embodiment, the same effect as the first embodiment described above can be achieved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information reproduction device for use with a magnetic recording medium storing information, the information reproduction device comprising:
   an analog/digital (AD) converter structured to convert an analog signal, which is reproduced from the information recorded in the magnetic recording medium, into a digital signal;
   a peak detecting unit structured to detect a peak point of the digital signal according to a threshold as a judgment level in accordance with an output of the AD converter; and
   an information generating unit structured to generate a rectangular waveform signal of the reproduced signal, waveform-shaped according to interval information of peak points detected by the peak detecting unit.

2. The information reproduction device according to claim 1;
   wherein the peak detecting unit is structured to calculate a time interval between neighboring peak points, and output the time interval information and peak-point information to the information generating unit; and
   by use of information being a peak point as a trigger, the information generating unit is structured to reverse a level of a signal, to be generated, from a first level to a second level, or otherwise reverse a level of a signal from the second level to the first level; then, from the peak point until having spent a period of the time interval between peak points, the information generating unit is structured to keep the signal, to be generated, at the second level or the first level; and at the time of having spent the period of the time interval between the peak points, the information generating unit is structured to reverse the level of the signal, to be generated, from the second level to the first level, or otherwise reverse the level of the signal from the first level to the second level.

3. The information reproduction device according to claim 1;
wherein, at the time of determining a peak value, the peak detecting unit is structured to calculate a correction value by multiplying a difference between a first peak value of a determination object and a second peak value, located at least one peak value before the first peak value, by a predetermined ratio based on the difference; and calculate a threshold by adding or subtracting the correction value to/from an intermediate value between the first peak value and the second peak value, and makes a judgment on whether or not the determination object is a peak value, by use of the threshold.

4. The information reproduction device according to claim 1;
wherein, at the time of determining a peak value, the peak detecting unit is structured to calculate a correction value by multiplying a difference between a first peak value of a determination object and a second peak value, located at least one peak value before the first peak value, by a predetermined ratio based on the difference; and calculate a threshold by adding or subtracting the correction value to/from an intermediate value between the first peak value and the second peak value, and makes a judgment on whether or not the determination object is a peak value, by use of the threshold and the intermediate value between the first peak value and the second peak value.

5. The information reproduction device according to claim 4;
wherein, at the time of determining a peak value, with respect to a first peak value of a determination object, the peak detecting unit is structured to:
use a second peak value, located immediately before the first peak value, and a third peak value, located two peak values before the first peak value, and
calculate a first correction value by multiplying a difference between the third peak value and the second peak value, by a predetermined ratio based on the difference; and calculate a first threshold by adding or subtracting the first correction value to/from a first intermediate value between the third peak value and the second peak value;
calculate a second correction value, by multiplying a difference between the second peak value and the first peak value by a predetermined ratio based on the difference; and calculate a second threshold by adding or subtracting the second correction value to/from a second intermediate value between the second peak value and the first peak value, and
determine the first peak value, by making sure that a value of a digital signal exceeds the first intermediate value between the third peak value and the second peak value, as well as the first threshold, and exceeds the second intermediate value between the second peak value and the first peak value, as well as the second threshold.

6. The information reproduction device according to claim 5;

wherein, in a reproduced signal, as peak values being placed across an intermediate value, there alternately exist a peak value at a maximum value side and a peak value at a minimum value side;
in the case where the first peak value of a determination object is a peak value at the minimum value side, the peak detecting unit is structured to:
use a second peak value at the maximum value side, located immediately before the first peak value, and a third peak value at the minimum value side, located two peak values before the first peak value; and
calculate the first correction value by multiplying a difference between the third peak value and the second peak value, by a predetermined ratio based on the difference; and calculate the first threshold, by adding the first correction value to the first intermediate value between the third peak value and the second peak value; and
set up the first threshold, at the maximum value side in relation to the first intermediate value between the third peak value and the second peak value;
then the peak detecting unit is structured the second correction value, by multiplying a difference between the second peak value and the first peak value by a predetermined ratio based on the difference; and calculate the second threshold, by adding the second correction value to the second intermediate value between the second peak value and the first peak value; and
set up the second threshold at the maximum value side in relation to the second intermediate value between the second peak value and the first peak value, and
determine the first peak value, by making sure that the value of the digital signal exceeds the first intermediate value between the third peak value and the second peak value as well as the first threshold; and exceeds the second intermediate value between the second peak value and the first peak value as well as the second threshold.

7. The information reproduction device according to claim 4;
wherein, in a reproduced signal, as peak values being placed across an intermediate value, there alternately exist a peak value at a maximum value side and a peak value at a minimum value side;
in the case where the first peak value of a determination object is a peak value at the maximum value side, the peak detecting unit is structured to:
use a second peak value at the minimum value side, located immediately before the first peak value, and a third peak value at the maximum value side, located two peak values before the first peak value; and
calculate the first correction value by multiplying a difference between the third peak value and the second peak value, by a predetermined ratio based on the difference; and
calculates the first threshold, by subtracting the first correction value from the first intermediate value between the third peak value and the second peak value; and
set up the first threshold, at the minimum value side in relation to the first intermediate value between the third peak value and the second peak value;
then the peak detecting unit is structured to:
calculate the second correction value, by multiplying a difference between the second peak value and the first peak value by a predetermined ratio based on the difference; and calculates the second threshold, by subtracting the second correction value from the second intermediate value between the second peak value and the first peak value; and set up the second threshold at the minimum value side in relation to the second intermediate value between the second peak value and the first peak value, and determine the first peak value, by making sure that the value of the digital signal exceeds the first intermediate value between the third peak value and the second peak value as well as the first threshold; and exceeds the second intermediate value between the second peak value and the first peak value as well as the second threshold.

8. The information reproduction device according to claim 6;

wherein the peak detecting unit is structured to determine the first peak value, by making sure that the value of the digital signal discretely changes from the third peak value to the second peak value so as to exceed the first intermediate value and the first threshold; and the value of the digital signal discretely changes from the first peak value to a next peak value so as to exceed the second intermediate value and the second threshold.

9. An information reproduction method for use with a magnetic recording medium storing information, the method comprising:

converting an analog signal, which is reproduced from the information recorded in the magnetic recording medium, into a digital signal;

detecting a peak point of the digital signal according to a threshold as a judgment level in accordance with an output of the converting an analog signal; and generating a rectangular waveform signal of the reproduced signal, waveform-shaped according to interval information of detected peak points detected.

10. The information reproduction method according to claim 9;

wherein the detecting the peak point comprises calculating a time interval between neighboring peak points; and by use of information being a peak point as a trigger, the generating a rectangular waveform comprises reversing a level of a signal, to be generated, from a first level to a second level, or otherwise reverses a level of a signal from the second level to the first level; then, from the peak point until having spent a period of the time interval between peak points, keeping the signal, to be generated, at the second level or the first level; and at the time of having spent the period of the time interval between the peak points, the generating a rectangular waveform comprises reversing the level of the signal, to be generated, from the second level to the first level, or otherwise reverses the level of the signal from the first level to the second level.

11. The information reproduction method according claim 9;

wherein, at the time of determining a peak value, the detecting a peak point comprises calculating a correction value by multiplying a difference between a first peak value of a determination object and a second peak value, located at least one peak value before the first peak value, by a predetermined ratio based on the difference; and calculating a threshold by adding or subtracting the correction value to/from an intermediate value between the first peak value and the second peak value, and making a judgment on whether or not the determination object is a peak value, by use of the threshold.

12. The information reproduction method according to claim 9;

wherein, at the time of determining a peak value, the detecting the peak point comprises calculating a correction value by multiplying a difference between a first peak value of a determination object and a second peak value, located at least one peak value before the first peak value, by a predetermined ratio based on the difference; and calculating a threshold by adding or subtracting the correction value to/from an intermediate value between the first peak value and the second peak value, and making a judgment on whether or not the determination object is a peak value, by use of the threshold and the intermediate value between the first peak value and the second peak value.

13. The information reproduction method according to claim 12;

wherein, at the time of determining a peak value, with respect to a first peak value of a determination object, the detecting the peak point comprises using a second peak value, located immediately before the first peak value, and a third peak value, located two peak values before the first peak value, and calculating a first correction value by multiplying a difference between the third peak value and the second peak value, by a predetermined ratio based on the difference; and calculates a first threshold by adding or subtracting the first correction value to/from a first intermediate value between the third peak value and the second peak value;

then calculating a second correction value, by multiplying a difference between the second peak value and the first peak value by a predetermined ratio based on the difference; and calculating a second threshold by adding or subtracting the second correction value to/from a second intermediate value between the second peak value and the first peak value, and determining the first peak value, by making sure that a value of a digital signal exceeds the first intermediate value between the third peak value and the second peak value, as well as the first threshold, and exceeds the second intermediate value between the second peak value and the first peak value, as well as the second threshold.

14. The information reproduction method according to claim 13;

wherein, in a reproduced signal, as peak values being placed across an intermediate value, there alternately exist a peak value at a maximum value side and a peak value at a minimum value side;

in the case where the first peak value of a determination object is a peak value at the minimum value side, the detecting the peak point comprises using a second peak value at the maximum value side, located immediately before the first peak value, and a third peak value at the minimum value side, located two peak values before the first peak value; and calculating the first correction value by multiplying a difference between the third peak value and the second peak value, by a predetermined ratio based on the difference; and calculating the first threshold, by adding the first correction value to the first intermediate value between the third peak value and the second peak value; and setting up the first threshold, at the maximum value side in relation to the first intermediate value between the third peak value and the second peak value;

then calculating the second correction value, by multiplying a difference between the second peak value and the first peak value by a predetermined ratio based on the difference; and calculating the second threshold, by adding the second correction value to the second intermediate value between the second peak value and the first peak value; and setting up the second threshold at the maximum value side in relation to the second intermediate value between the second peak value and the first peak value, and determining the first peak value, by making sure that the value of the digital signal exceeds the first intermediate value between the third peak value and the second peak value as well as the first threshold; and exceeds the second intermediate value between the second peak value and the first peak value as well as the second threshold.

15. The information reproduction method according to claim 12;

wherein, in a reproduced signal, as peak values being placed across an intermediate value, there alternately exist a peak value at a maximum value side and a peak value at a minimum value side;

in the case where the first peak value of a determination object is a peak value at the maximum value side, the detecting the peak point comprises using a second peak value at the minimum value side, located immediately before the first peak value, and a third peak value at the maximum value side, located two peak values before the first peak value; and calculating the first correction value by multiplying a difference between the third peak value and the second peak value, by a predetermined ratio based on the difference; and calculating the first threshold, by subtracting the first correction value from the first intermediate value between the third peak value and the second peak value; and setting up the first threshold, at the minimum value side in relation to the first intermediate value between the third peak value and the second peak value;

then calculating the second correction value, by multiplying a difference between the second peak value and the first peak value by a predetermined ratio based on the difference; and calculating the second threshold, by subtracting the second correction value from the second intermediate value between the second peak value and the first peak value; and setting up the second threshold at the minimum value side in relation to the second intermediate value between the second peak value and the first peak value, and determining the first peak value, by making sure that the value of the digital signal exceeds the first intermediate value between the third peak value and the second peak value as well as the first threshold; and exceeds the second intermediate value between the second peak value and the first peak value as well as the second threshold.

16. The information reproduction method according to claim 14;

wherein the detecting the peak point comprises determining the first peak value, by making sure that the value of the digital signal discretely changes from the third peak value to the second peak value so as to exceed the first intermediate value and the first threshold; and the value of the digital signal discretely changes from the first peak value to a next peak value so as to exceed the second intermediate value and the second threshold.

* * * * *